(12) United States Patent  
Fujita

(10) Patent No.: US 7,660,223 B2  
(45) Date of Patent: Feb. 9, 2010

(54) DISC DEVICE

(75) Inventor: Kouji Fujita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 118 days.

(21) Appl. No.: 12/054,426

(22) Filed: Mar. 25, 2008

(65) Prior Publication Data

US 2008/0298211 A1 Dec. 4, 2008

(30) Foreign Application Priority Data

May 29, 2007 (JP) .............................. 2007-141270

(51) Int. Cl.
*G11B 7/00* (2006.01)
(52) U.S. Cl. ................................. 369/53.28; 369/44.27
(58) Field of Classification Search .............. 369/44.27, 369/44.29, 44.23, 44.25, 44.35, 275.1–275.5, 369/47.15, 47.55, 53.28, 53.22, 30.3, 94, 369/116, 112.23

See application file for complete search history.

(56) References Cited

U.S. PATENT DOCUMENTS 5,745,450 A * 4/1998 Miyazono ................ 369/44.27

FOREIGN PATENT DOCUMENTS

JP 2000-222744 8/2000
JP 2006-338783 12/2006

* cited by examiner

*Primary Examiner*—Ali Neyzari
(74) *Attorney, Agent, or Firm*—Antonelli, Terry, Stout & Kraus, LLP.

(57) ABSTRACT

A disc device includes a lens that focuses a laser light on an optical disc surface, a focus drive unit that drives the lens in a focusing direction, a focus control unit that controls to focus the laser light on the optical disc surface, a focus displacement detecting unit that detects a displaced amount in the focusing direction, a differentiation unit that differentiates a focus displacement detected signal, and a unit that inverts a sign of a differentiated signal, thereby, the disc device is driven intermittently to restrain a motion of an objective lens in a focusing direction and avoid colliding the objective lens with the optical disc surface.

4 Claims, 5 Drawing Sheets

DISC DEVICE

INCORPORATION BY REFERENCE

The present application claims priority from Japanese application JP 2007-141270 filed on May 29, 2007, the content of which is hereby incorporated by reference into this application.

BACKGROUND OF THE INVENTION

1. Field of the Invention

The present invention relates to techniques to control an objective lens in a disc device.

2. Description of the Related Art

There has been a disclosure to avoid colliding an optical disc surface with an objective lens in JP-A-2006-338783, in which a lens protector is arranged around or adjacently to the objective lens so that the objective lens can avoid directly colliding with the optical disc surface. JP-A-2000-222744 also discloses that a focus lens is forcibly moved in a further direction from the optical disc surface instead of a focus control if the focus control cannot be functioned.

SUMMARY OF THE INVENTION

In these days, recording devices have been developed to be used for Blue-lay Disc (hereinafter, referring to as BD). The BD has a specification of 405 nm in laser wavelength, 0.85 in numerical aperture (NA) of the objective lens, and 0.1 mm in thickness of a transparent resin substrate. A recording capacity for a piece (a layer) of the optical disc is large as 23.3 GB.

However, a distance between the optical disc surface and the objective lens becomes to the extent of 200 µm in proximity at a focused focal point because of 0.85 in NA. Further, a distance between the optical disc surface and objective lens also becomes in a range of 400 µm to 500 µm on a condition where the objective lens is not controlled, therefore, necessity for avoiding a collision problem between the optical disc surface on rotation and objective lens has been highly demanded.

An object of the invention is to provide a disc device having an intermittent operation in which a recording or reproducing operation and a pause operation are performed alternately and repeatedly. In this way, a collision avoidance control is provided for the objective lens and optical disc surface so that a mechanical shock and vibration do not occur between them, when a focus control for the objective lens is paused.

In order to achieve the object, the disc device is intermittently driven, and controlled so that a motion in a focusing direction of the objective lens is restrained in response to the intermittent operation.

Therefore, the objective lens can be avoided colliding with the optical disc surface on rotation, thereby preventing the optical disc surface from a mechanical damage.

Other objects, features and advantages of the invention will become apparent from the following description of the embodiments of the invention taken in conjunction with the accompanying drawings.

DESCRIPTION OF THE INVENTION

Figure 1:
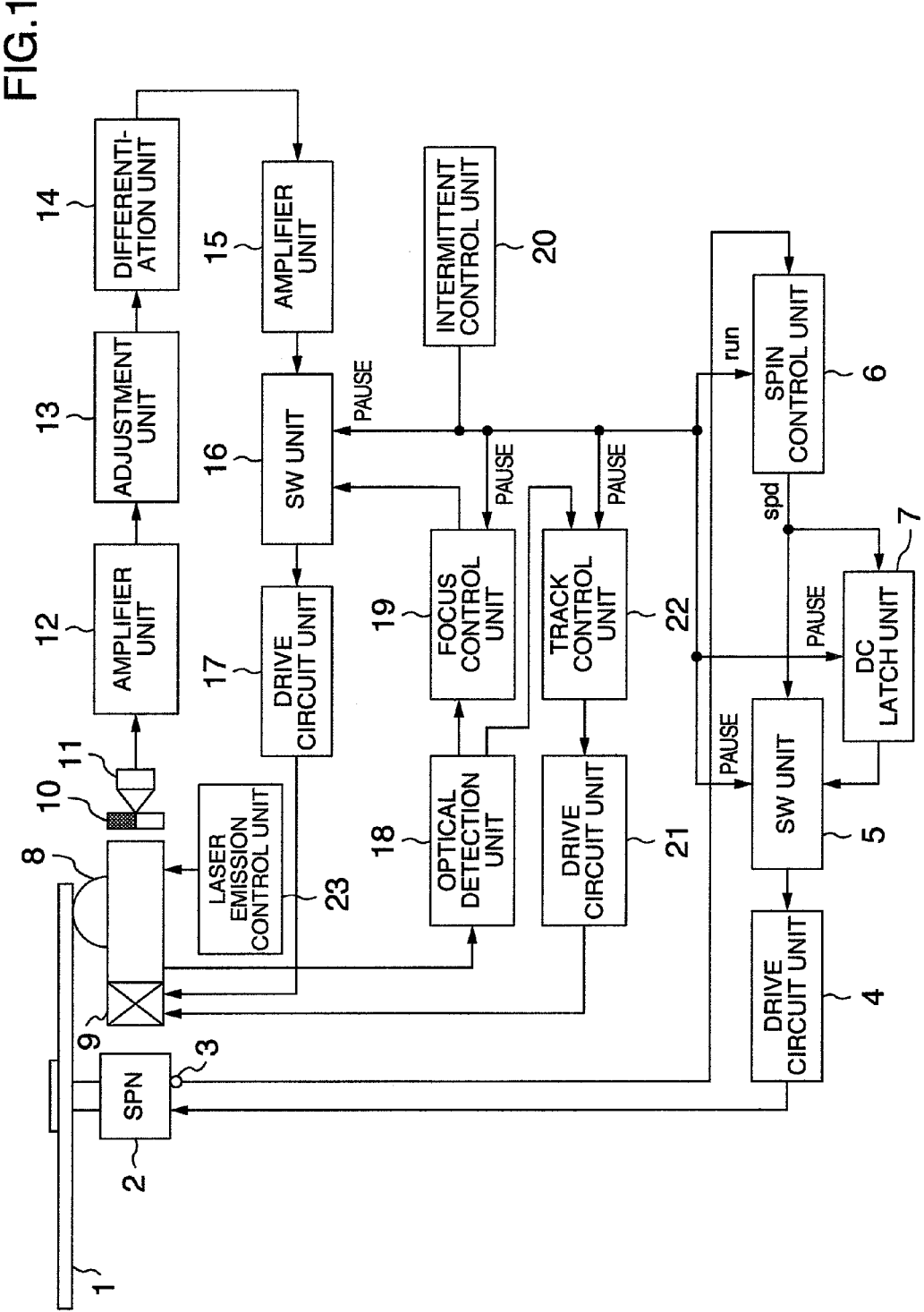
FIG. 1 is a circuit block diagram showing a disc device in a first embodiment of the invention.

First, an outline of the invention will be described below. A focus control is performed so that a focused focal point distance between an objective lens and an optical disc is positioned close at 200 µm since the BD is 0.85 in high numerical aperture. On the other hand, when the focus control is not performed, a distance between the objective lens and the optical disc is not determined uniquely by an the optical system, a current response of a focus actuator and a mass of the focus actuator. In most cases, the focused focal point distance is in range of 400 µm to 500 µm.

On an operation of the focus control, the objective lens does not collide with the optical disc surface by causing a mechanical shock even though the focused focal point distance is 200 µm. This is because a position control is performed at the focused focal point position of 200 µm by a focus servo control.

However, when a mechanical shock occurs on a time period during which the focus control is paused, the objective lens suspended by a spring collides with the optical disc on rotation. Therefore, a problem arises such that the optical disc is subject to a mechanical damage. The invention intends to solve the problem by lens-collision preventing unit on the time period during which the focus control is paused.

Here, a reason why the pause operation of the focus control is necessary is described below. A portable optical disc device which is mainly operated by a battery requires to restrain its power consumption in low. In order to make the power consumption low, an intermittent recording is effective such that data is intermittently recorded in the disc.

In the case of intermittent recording, first, data to be recorded in the disc is stored temporarily in a memory. When the data to be recorded in the memory reaches to a predetermined amount which is a target to start the recording in the disc, the data is recorded in the disc by a rate faster than a transfer rate of the data to be transferred to the memory. The recording is then halted when the data stored in the memory decreases down to a predetermined amount which is a target to halt the recording in the disc.

In this way, the data to be recorded in the disc is divided into packets, and the data is not consecutively recorded in a time period during which the data in one packet is recorded. When the recording for the one packet is completed, an operation is repeated so that the recording operation is paused during a time period, until a packet to be subsequently recorded is stored in the memory.

This pause time period becomes a pause time period for the focus control. During the pause time period, an operation is performed such that an emission from a disc device laser is halted, a power supply to electronic circuits is halted, and the focus and tracking controls are halted. The disc device is then transferred to a power saving mode, so that the power consumption for the device can be reduced.

Particularly, the pauses of circuits for the recording and reproducing and the digital servo circuit are effective in the power saving mode. The digital servo circuit includes a function of the focus control. That the focus control is paused is that a part of the objective lens movably operated with the focus servo becomes uncontrollable condition, so that the objective lens is suspended in midair by a spring and turned into a condition where it is easily displaced in a focusing direction by the mechanical shock and vibration.

Figure 2:
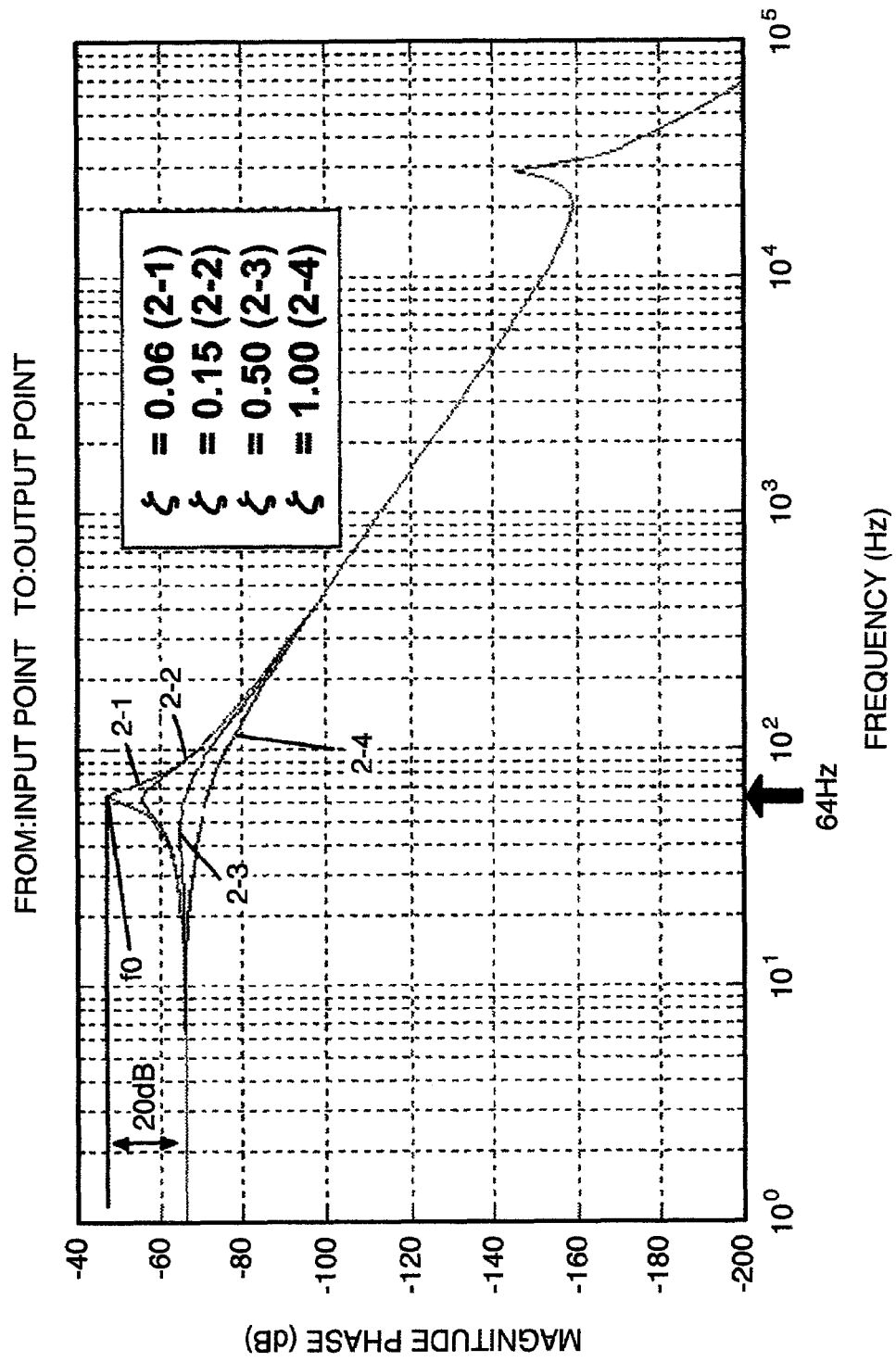
FIG. 2 is a characteristic diagram showing focus lens resonance frequency characteristics.
Figure 3:
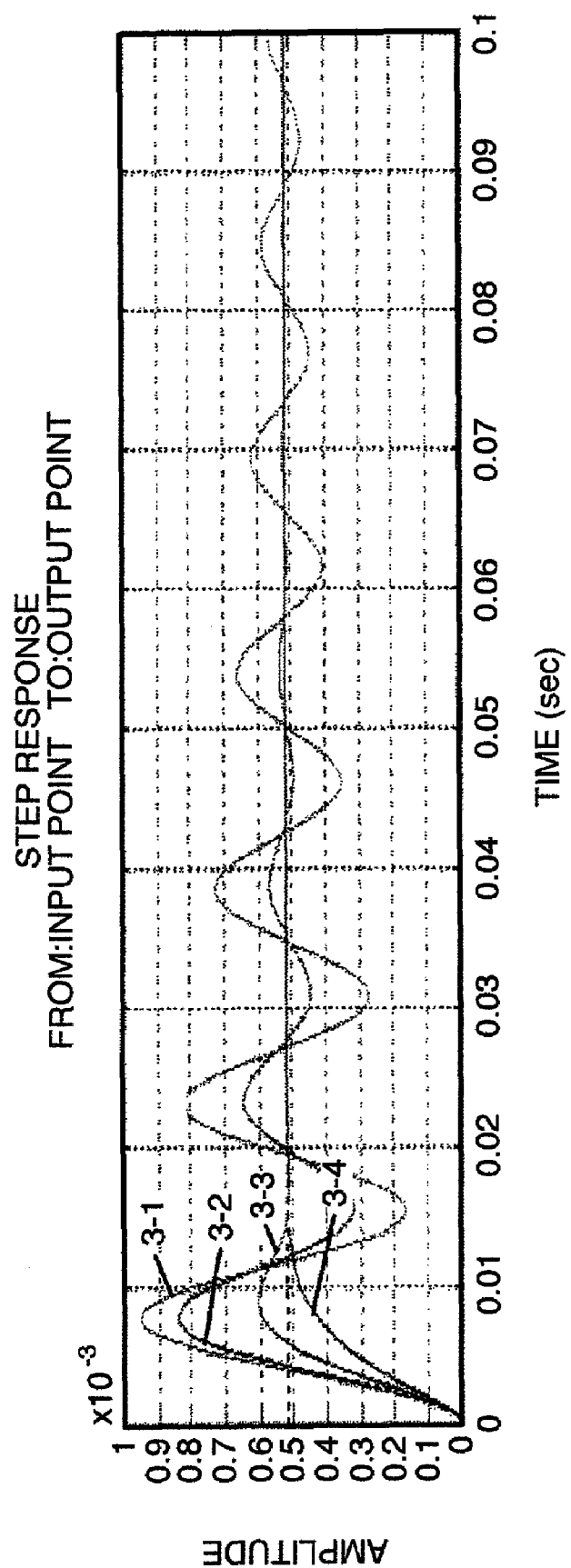
FIG. 3 is a diagram showing an operation of focus lens resonance and damping.

FIG. 2 shows an example of a frequency response characteristic in the focusing direction relative to a combination of the objective lens and the spring. A curve 2-1 in FIG. 2 shows a secondary characteristic. A significant point in this case is that a response indicates 20 dB as a displaced amount against a mechanical shock (disturbance) the same frequency as a resonance frequency because of having a resonance point f0 (65 Hz). This indicates that a vibrating amplitude displacement of the objective lens becomes large, and the objective lens then collides with the optical disc, when the objective lens is suspended in midair by the spring and the a mechanical shock frequency is matched with a primary resonance frequency of the spring. FIG. 3 shows an attenuating characteristic of the objective lens in relation to a time axis. The characteristic of the curve 2-1 in FIG. 2 corresponds to that of a curve 3-1 in FIG. 3. The curve 3-1 shows a condition where an objective lens displacement on receiving the mechanical shock is attenuated with a time.

In addition, curves 2-2, 2-3 and 2-4 in FIG. 2 indicate the vibrating amplitude displacement of the objective lens in a condition where the frequency response characteristic of the objective lens in the focusing direction is decreased gradually and the motion of objective lens is moved slowly. Afterward, a control for restraining the motion of objective lens in the focusing direction is referred to as a focusing lens damping.

In the case of the embodiment, an intermittent operation of a spindle motor for rotating the optical disc is performed to further enhance the power saving mode. A rotation power of the spindle motor becomes a maximum at its start and stop on applying a brake. A large power is not consumed when the rotation starts once. Therefore, in the case where the intermittent interval is several tens of seconds, the power saving effect is higher than halting the rotation, when the spindle motor rotates continuously even if the focus control is on the pause time period.

Now, a problem arises in this case. That is, the optical disc rotates continuously on the pause time period during which the digital servo circuit is halted, and the focus control is paused. Therefore, a collision energy becomes large when the objective lens collides with the optical disc surface by causing the mechanical shock and vibration, so that lens-collision avoidance unit is essentially required.

An optimum example in this embodiment is adapted to a portable recorder using the optical disc, such as a video camera and audio recorder.

Hereinafter, embodiments of the invention will be described below.

FIG. 1 is a circuit diagram showing a disc device having an intermittent operation and lens-collision avoidance unit used for an optical disc device, in a first embodiment. Referring to FIG. 1, the disc device is constituted by an optical disc 1, a spindle motor 2, a rotation detecting unit 3, a drive circuit unit 4, a SW circuit unit 5, a Spin control unit 6, a DC latch unit 7, an objective lens 8, a focus driving coil 9, a focus position detecting unit 10, an optical reflector unit 11, an amplifier unit 12, an adjustment unit 13, a differentiation circuit unit 14, an amplifier unit 15, a SW circuit unit 16, a drive circuit unit 17, an optical detection unit 18, a focus control unit 19, an intermittent control unit 20, a drive circuit unit 21, a track control unit 22, and a laser emission control unit 23.

According to the foregoing constitution, the Spin control unit 6 to control the rotation of spindle motor 2 in a constant speed outputs a spindle control signal "spd" by receiving a signal "run" from the intermittent control unit 20, when the optical disc 1 is mounted on a part of the spindle motor 2. The signal "spd" is amplified in current to a spindle motor drive signal by the drive circuit unit 4 via the SW circuit unit 5 to be applied to the spindle motor 2 to be rotated.

Rotation speed information of the spindle motor 2 is detected as a detected signal by the rotation detecting unit 3 and supplied to the Spin control unit 6. The Spin control unit 6 increases or decreases the signal "spd" so that the rotation detected signal is turned into a predetermined value, and controls the rotation of spindle motor 2 in the constant speed.

Here, a power saving mode for a spindle motor control will be described below. The power saving mode makes a circuit for a recording and reproducing and a digital servo circuit both incorporated in a mainly used LSI paused. The servo circuit requires unit which continuously rotates the spindle motor 2 on the pause time period since it includes the Spin control unit 6.

In the case where an interval time of the intermittent operation is long, for example, equal to or greater than several minutes, the power saving effect is higher than that the spindle motor 2 rotates continuously, when the spindle motor 2 is halted on the pause time period. However, in the foregoing intermittent operation, the start and stop operations frequently applied to the spindle motor 2 causes a large current consumption since the interval time is equal to or less than several tens of seconds. Therefore, the rotation of spindle motor 2 should be maintained in the intermittent operation during the short interval time, such as several tens of seconds.

In the case of this embodiment, an analog value of the signal "spd" at a time point prior to the pause is held temporarily when a pause signal is supplied to the DC latch unit 7 from the intermittent control unit 20. The Spin control unit 6 is transferred to a pause state, and the SW circuit unit 5 is switched to a spd hold signal from the DC latch unit 7. An operation of the drive circuit unit 4 and subsequent units is the same as the foregoing description. The spindle motor 2 maintains the rotation prior to the pause even on the pause period.

The rotation of spindle motor 2 is controlled, and a laser light is then irradiated on the optical disc which executes a laser emission. A reflected light from the optical disc is converted into an electric signal by the optical detection unit 18. An error signal required for the servo control is detected and transmitted to the focus control unit 19 and track control unit 22.

The track control unit 22 receives a track error signal from the optical detection unit 18 to supply a current drive signal to the focus driving coil 9 via the drive circuit unit 21 so that a laser spot is positioned at a center of track on the optical disc. The track control unit 22 receives the pause signal from the intermittent control unit 20 to transfer to the pause state, and the focus driving coil 9 becomes a free state.

On the other hand, the focus control unit 19 receives a focus error signal from the optical detection unit 18 to supply a current drive signal to the focus driving coil 9 via the SW circuit unit 16 and drive circuit unit 17 so that the focus error signal turns into a focused focal point position on which the laser spot is focused. Here, the focus lens damping will be described below on the pause time period of the focus control unit 19.

On the pause time period, since the focus lens damping is performed in a condition where the laser is turned off, the focus control unit 19 is halted, the track control unit 22 is halted, and the Spin control unit 6 is halted, the focus position detecting unit 10 and optical reflector unit 11 are provided for detecting an objective lens displacement amount in the focusing direction in this embodiment.

Figure 4:
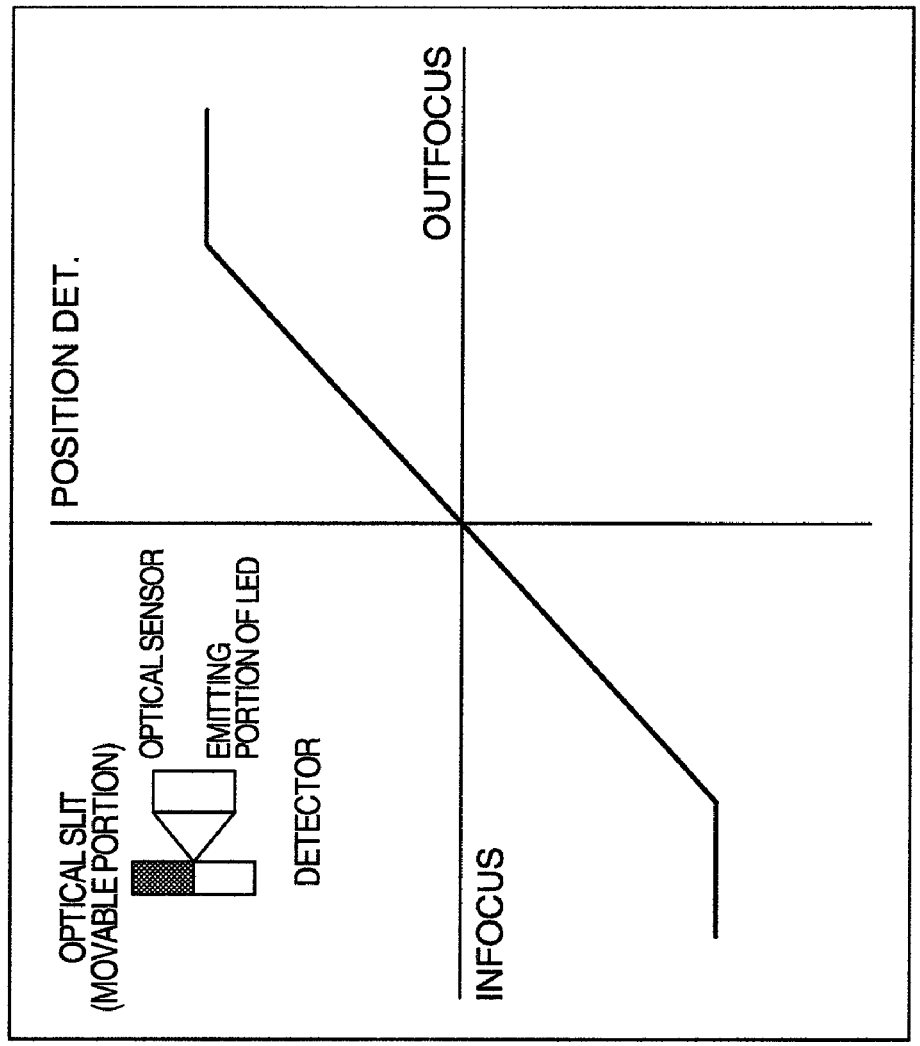
FIG. 4 is a diagram showing a lens position detector characteristic.

FIG. 4 is a characteristic diagram of an objective lens displacement amount detector. The displacement amount detector in FIG. 4 includes an optical slit portion movably cooperated with that the objective lens 8 moves in a direction as an in-focus direction close in the optical disc 1 and in a direction as an out-focus direction away from the optical disc 1, and also mounts a reflector for the slit portion which includes an emitting portion of an LED and an optical sensor for receiving a reflected light from the slit portion. According to the foregoing constitution, a signal level from the optical sensor can be detected linearly in response to a focused position which is detected on the pause time period by the foregoing simple structure.

A pause signal for indicating the pause time period is supplied to the focus control unit 19 from the intermittent control unit 20 to thereby make the focus control unit 19 paused. On the other hand, the SW circuit unit 16 receives the pause signal to switch a signal from the focus control unit 19 to a signal path from the amplifier unit 15. A focus position detected signal from the optical reflector unit 11 is amplified by the amplifier unit 12 to adjust its amplitude by the adjustment unit 13 and then extract an objective lens displaced component (AC component) by the differentiation circuit unit 14. The extracted signal is a displaced component of the objective lens 8, in which the displaced component is inverted as a code and then amplified by the amplifier 15.

The amplified signal is supplied, as a current drive signal, to the focus driving coil 9 via the SW circuit unit 16 and drive circuit unit 17. In this way, the displaced component of the objective lens 8 is applied to the focus driving coil 9 in a negative feedback, so that the objective lens 8 can be damped electrically.

Referring back to FIG. 2, this example shows the frequency response characteristic of focusing lens damping in the focusing direction in a combination of the objective lens 8 and the spring. For example, the damping is made in a range of damping coefficient $\zeta$ 0.7 to 1.0.

FIG. 2 shows the characteristic curves 2-1 and 2-2, however, in the case of the circuitry in this embodiment, it is possible to provide a characteristic of such as damping coefficient $\zeta$ 0.5 or 1.0.

FIG. 3 shows an attenuating characteristic of the objective lens 8 in relation to a time axis. Curves 3-3 and 3-4 in FIG. 3 correspond to the damping coefficients $\zeta$ 0.5 and 1.0, respectively.

As described above, on the pause time period, the objective lens 8 is damped in the focusing direction so that it can be made restrained or immovable in the motion even in the pause time period. Therefore, the objective lens 8 and optical disc 1 can be prevented from being collision caused by the mechanical shock and vibration. In the case of system described in this embodiment, the current flows into the focus driving coil 9 when the objective lens 8 is displaced. That is, since the current does not flow into the focus driving coil 9 in a normal condition (in a condition where a vibration is not applied to the objective lens 8 when the displacement does not occur at the lens), an optimum method can be provided for the power saving.

Figure 5:
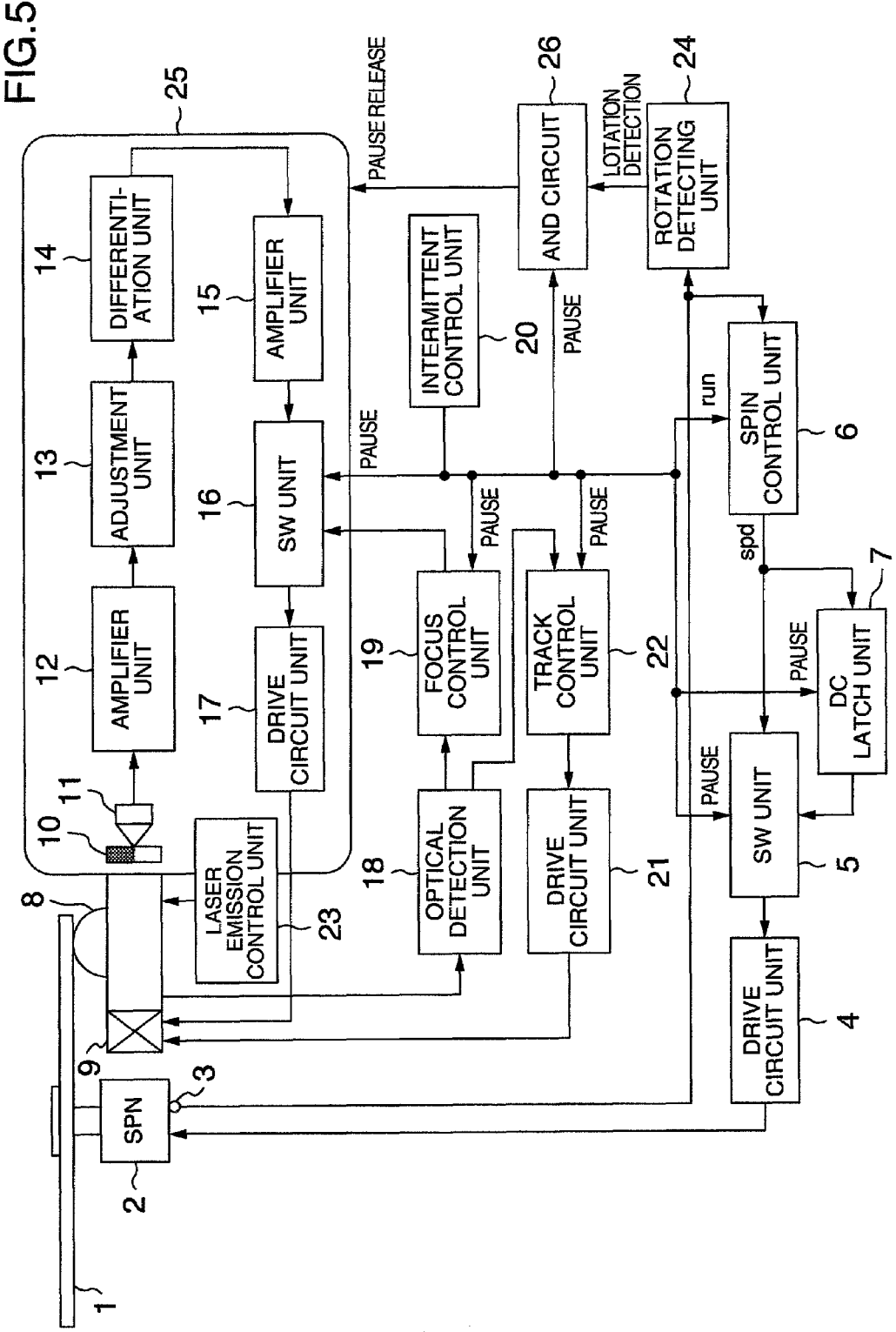
FIG. 5 is a circuit block diagram showing a disc device in a second embodiment of the invention.

Next, a second embodiment of the invention will be described below. FIG. 5 is a circuit diagram showing a disc device including an intermittent operation and lens-collision avoidance unit in an optical disc device. A description for the same blocks shown in FIG. 1 is omitted. FIG. 4 is an explanatory diagram showing a curve of the focus lens damping which is performed in a limited way when the digital servo is on the pause time period and the spindle motor 2 is rotated. A rotation detecting unit 24 fetches a signal from the rotation detecting unit 3 relative to the spindle motor 2, and judges whether the spindle motor 2 rotates by a speed equal to or faster than a predetermined speed. The rotation detecting unit 24 outputs a rotation detected signal to an AND circuit 26 if it detects a rotation speed equal to or faster than the predetermined speed. The AND circuit 26 receives the pause signal from the intermittent control unit 20 to transmit a pause release signal to a focus lens damping circuit block 25. The focus lens damping circuit block 25 receives the pause release signal, so that the focus lens damping is actuated to an operating state by an electric power supplied to the circuit block 25. Collision between the objective lens 8 and optical disc 1 does not occur while the spindle motor 2 is halted, therefore, both of the portions are not subject to a mechanical damage, and the focus lens damping is not necessary in this case. According to the embodiment, the control is executed such that the focus lens damping is performed to restrain the motion of the objective lens 8 on the pause time period for the rotation of spindle motor 2 and the digital servo, so that it is not necessary to supply a useless electric power to the circuits, therefore, further improve the power saving effect.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A disc device comprising:
a lens which focuses a laser light on an optical disc surface;
focus drive unit which drives the lens in a focusing direction;
focus control unit which controls to focus the laser light on the optical disc surface;
focus displacement detecting unit which detects a displaced amount in the focusing direction;
differentiation unit which differentiates a focus displacement detected signal; and
unit which inverts a sign of a differentiated signal,
wherein the differentiated signal which is inverted, and a focus control signal from the focus control unit, are exclusively switched with each other to be supplied to the focus drive unit.

2. A disc device comprising:
a lens which focuses a laser light on an optical disc surface;
focus drive unit which drives the lens in a focusing direction;
focus control unit which controls to focus the laser light on the optical disc surface;
focus displacement detecting unit which detects a displaced amount in the focusing direction;
differentiation unit which differentiates a focus displacement detected signal; and
unit which inverts a sign of a differentiated signal,
wherein the differentiated signal which is inverted is set as a control signal for the focus drive unit on a time period during which the focus control is paused.

3. A disc device comprising:
optical disc rotation control unit which controls a rotation of an optical disc;
a lens which focuses a laser light on an optical disc surface;
focus drive unit which drives the lens in a focusing direction;
focus control unit which controls to focus the laser light on an optical disc surface;
focus displacement detecting unit which detects a displaced amount in the focusing direction;

differentiation unit which differentiates a focus displacement detected signal;
unit which inverts a sign of a differentiated signal; and
pause control unit which pauses the focus control unit,
wherein the differentiated signal, which is inverted, from the differentiation unit is set to a control signal for the focus drive unit on a time period during which the rotation of the optical disc is detected by the optical disc rotation control unit and a focusing control is paused by the pause control unit.

4. A disc device comprising:
optical disc rotation control unit which controls a rotation of an optical disc;
a lens which focuses a laser light on an optical disc surface;
focus drive unit which drives the lens in a focusing direction;
focus control unit which controls to focus the laser light on an optical disc surface;
focus displacement detecting unit which detects a displaced amount in the focusing direction;
pause control unit which pauses the focus control unit; and
control unit which controls such that a motion of an objective lens in the focusing direction is restrained on a time period during which the rotation of the optical disc is detected by the optical disc rotation control unit and a focusing control is paused by the pause control unit.

* * * * *